United States Patent [19]

Moore

[11] 4,099,425
[45] Jul. 11, 1978

[54] METHOD OF MAKING PUSH-PULL CABLE CONDUIT AND PRODUCT

[75] Inventor: Bruce H. Moore, Kent, Ohio

[73] Assignee: Samuel Moore and Company, Aurora, Ohio

[21] Appl. No.: 691,499

[22] Filed: Jun. 1, 1976

[51] Int. Cl.² .................................................. F16C 1/10
[52] U.S. Cl. ........................... 74/501 P; 138/133;138;
138/141; 156/53; 156/143; 156/149;
156/244.13; 156/500
[58] Field of Search ............... 74/501 R, 501 P; 64/2;
138/138, 124, 127, 125, 126, 129, 132, 133, 134,
173, 141, DIG. 3; 156/143, 53, 500, 148, 149

[56] References Cited

U.S. PATENT DOCUMENTS

| | | | |
|---|---|---|---|
| 2,564,602 | 8/1951 | Hurst | 138/127 X |
| 3,063,303 | 11/1962 | Cadwallader | 138/127 X |
| 3,138,511 | 6/1964 | Cadwalader | 156/143 X |
| 3,176,538 | 4/1965 | Hurlow | 74/501 R |
| 3,249,666 | 5/1966 | French | 138/127 UX |
| 3,258,031 | 6/1966 | French | 138/127 |
| 3,320,665 | 5/1967 | Morse | 74/501 P |
| 3,357,456 | 12/1967 | Grawey | 156/143 X |

*Primary Examiner*—Clarence R. Gordon
*Attorney, Agent, or Firm*—Hamilton, Renner & Kenner

[57] ABSTRACT

A pushpull cable conduit is made by continuously moving a tubular mandrel through a crosshead extruding die, forming a tape of micro-porous polytetrafluoroethylene resin into cylindrical form covering the mandrel as it enters the extruding die, extruding an outer layer of fluid polymeric material over the cylindrical covering in the presence of heat, helically wrapping contiguous wires over said outer layer to form a wire layer, extruding an outer covering of thermoplastic material over the wire layer, and removing the tubular mandrel. The porosity of the polytetrafluoroethylene covering insures a good heat bond with the outer layer of fluid polymeric material and also provides a lubricant reservoir in its inner surface, thereby minimizing friction with the cable core and greatly reducing sound transmission.

20 Claims, 6 Drawing Figures

METHOD OF MAKING PUSH-PULL CABLE
CONDUIT AND PRODUCT

BACKGROUND OF THE INVENTION

In the past, considerable experimentation has been had with respect to reducing the friction between the wire core and conduit of push-pull cables. To this end the cable core has been coated with polymeric material such as Teflon, and the conduit has been lined with nylon or Teflon. An example of such construction is disclosed in U.S. Pat. No. 3,176,538, in which the twisted wire core has a plastic covering of Teflon, and the conduit has an inner layer of nylon. The patent states that other suitable plastics may be used but the core coating of Teflon and the inner conduit layer of nylon are preferred because of their self-lubricating characteristics.

While the Teflon coated core and the nylon or plastic lined conduit of U.S. Pat. No. 3,176,538 have improved efficiency as compared with prior push-pull cables having a wire core and a helical wire casing, the patented construction still had a high noise transmission level and considerable friction, because of the limited amount of self-lubrication inherent in the plastic materials of the core coating and conduit lining. Moreover, it is difficult continuously to form the inner plastic lining of the conduit with a smooth inner surface.

SUMMARY OF THE INVENTION

It is an object of the present invention to provide an improved method of continuously making an improved push-pull cable conduit having an inner layer of micro-porous plastic material which provides an improved heat bond between its outer surface and an outer plastic covering and which provides a lubricant reservoir in its inner surface.

Another object is to provide an improved method of continuously making an improved push-pull cable conduit having a liner of micro-porous plastic material which comprises passing a continuous mandrel through an extrusion die and forming a tape of the material into a cylindrical covering over the mandrel as it enters the die over which a polymeric layer is extruded.

A further object is to provide an improved push-pull cable conduit having an inner layer of micro-porous plastic material which provides a lubricant reservoir on its inner surface and is bonded at its outer surface with an extruded layer of polymeric material.

DESCRIPTION OF A PREFERRED EMBODIMENT

Figure 6:
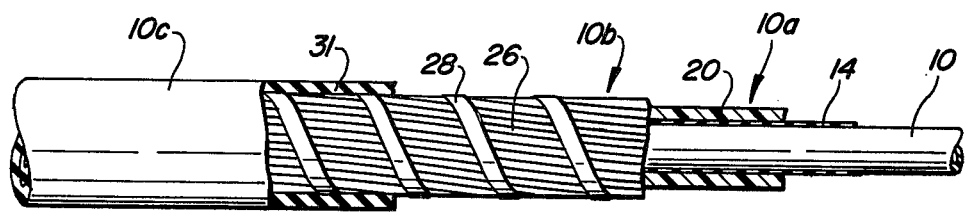
FIG. 6 is an enlarged fragmentary elevational view, partly broken away and in section, of the improved cable conduit shown in FIG. 4, before the tubular inner mandrel is removed.

The apparatus for carrying out the improved method of continuously making the completed conduit shown in FIG. 6 is illustrated schematically and sequentially in FIGS. 1 – 4. A flexible tubular mandrel core 10, preferably of highly temperature-resistant nylon is stored on a reel which becomes the payoff reel 11 in FIG. 1. This tubular mandrel may be extruded in lengths of, say, 5,000 feet by a known method in which the O.D. of the tube is held to close tolerance consonant with the desired I.D. of the conduit.

Figure 5:
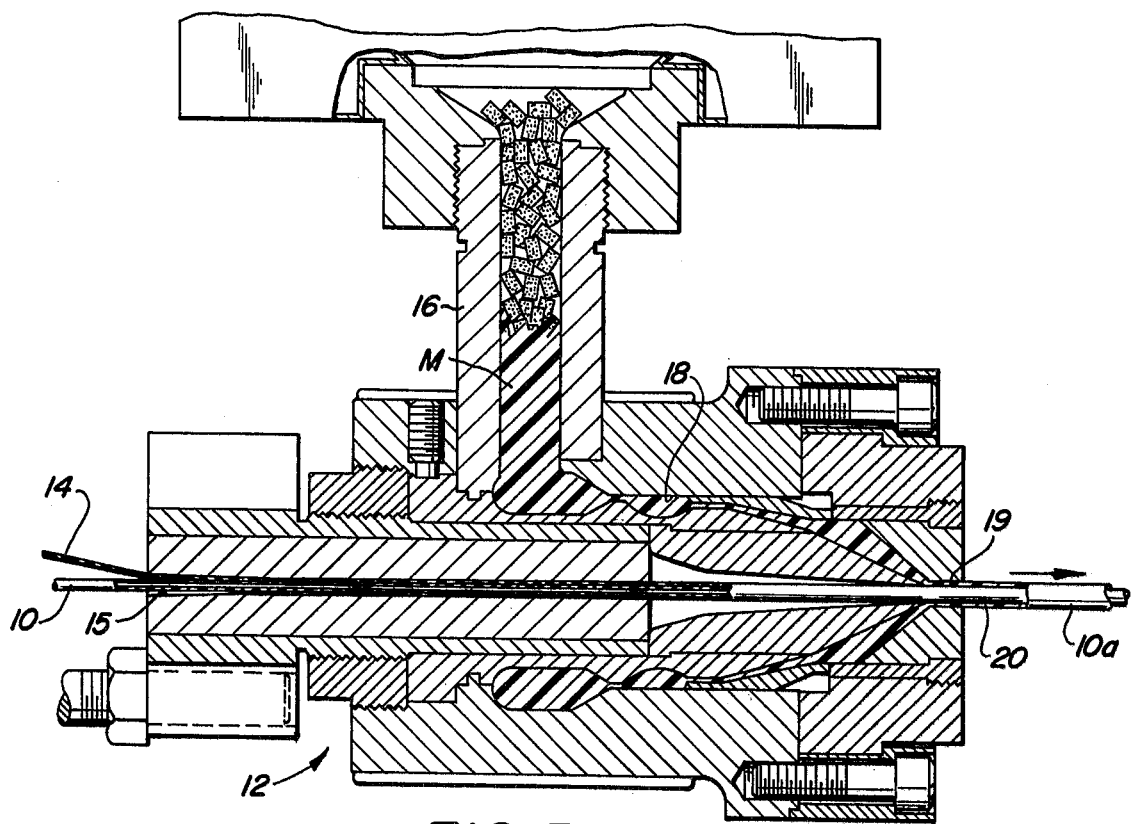
FIG. 5 is an enlarged vertical sectional view of the crosshead extrusion die shown in schematic elevation in FIG. 1.

From the payoff reel 11, the mandrel tube 10 passes into the crosshead extrusion die indicated generally at 12 and in cross section in FIG. 5. A supply spool 13 of tape or ribbon 14 is located adjacent to the entrance of the extrusion die 12, and the tape is passed from spool 13 through a transversely curved longitudinally tapered guide orifice 15 (FIG. 5) which encircles the tube 10 and gradually forms the tape into cylindrical shape closely encasing the mandrel tube 10 as it enters the die.

Tape 14 may be a micro-porous expanded form of a fluorocarbonated polymer such as Polytetrafluoroethylene (PTFE), Fluorinated ethylene propylene (FEP), Perfluoroalkoxy (PFA) all of which are sold by E. I. Du Pont, or it may be Poly(chlorotrifluoroethylene) sold under the trade name KEL-F by Minnesota Mining and Manufacturing Company, Ethylene-polytetrafluoroethylene Copolymer sold under the trade name TEFZEL by E. I. Du Pont, Poly(ethylene-chlorotrifluoroethylene) sold under the trade name HALAR by Allied Chemical Corporation, Polyvinylidene Fluoride as sold under the trade name KYNAR by Pennwalt Corporation, or suitable equivalents thereof.

The tape 14 is preferably a micro-porous expanded structure of polytetrafluoroethylene resin which is manufactured under the trademark GORE-TEX by W. L. Gore & Associates, Inc. of Elkton, Maryland. The tape is approximately 0.0035 inches thick and has a 65% porosity, that is, 65% of its volume is open or air-filled pores. It is acid-resistant, has high tensile strength and is unaffected by temperatures from $-350°$ to $+500°$ F. It is slippery to the touch and non-abrasive.

A polymeric melt flow M is supplied to the die through the vertical tube 16 (FIG. 5) from which it is forced under pressure through an annular passageway 18 to the exit nozzle 19 of the die, and is extruded around the tape covering at a closely controlled thickness to form the layer 20. The die 12 is heated to a desired temperature by heating elements (not shown) to maintain the polymeric melt at a temperature at which it will enter the pores on the outer surface of the covering and effect a good bond therewith. Alternatively, a liquid coating of the polymeric melt material, or a material compatible therewith, may be first applied to the outer surface of the tape covering and the hot polymeric material extruded thereover.

The polymeric melt supplied through tube 16 is preferably a thermoplastic material such as nylon, and the extrusion die is maintained at a temperature of about 700° F. to reduce the viscosity of the nylon sufficiently to insure its penetration into the outer pores of the Gore-Tex covering.

On leaving the extruder die 12, the conduit 10a now consisting of an outer layer of nylon over the tape-covered mandrel is passed through a cooling trough 21 and then through a pulling device 22 of known construction, preferably comprising driven flexible belts 23 engaging the conduit, from which it is coiled around a storage reel 24.

Figure 1:
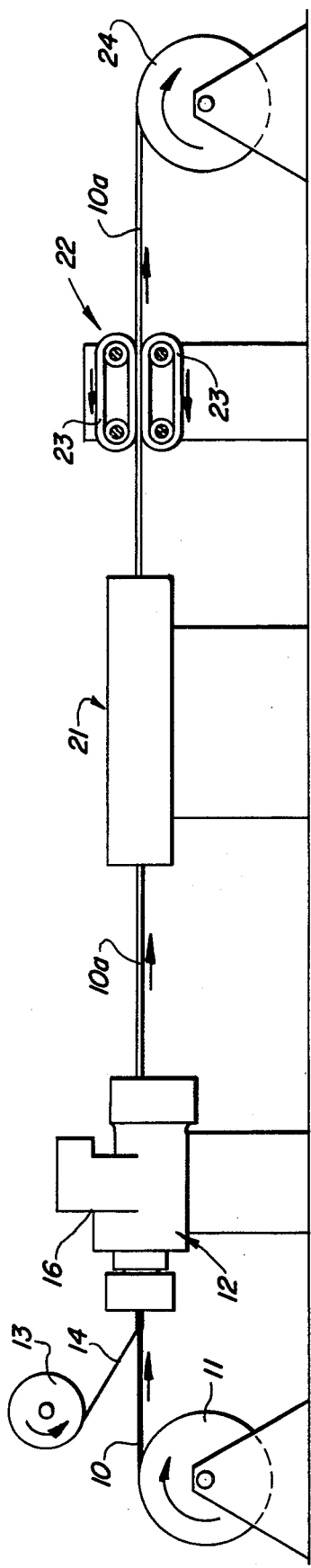
FIG. 1 is a schematic side elevation of a first part of a line of apparatus for continuously making the improved push-pull cable conduit.
Figure 2:
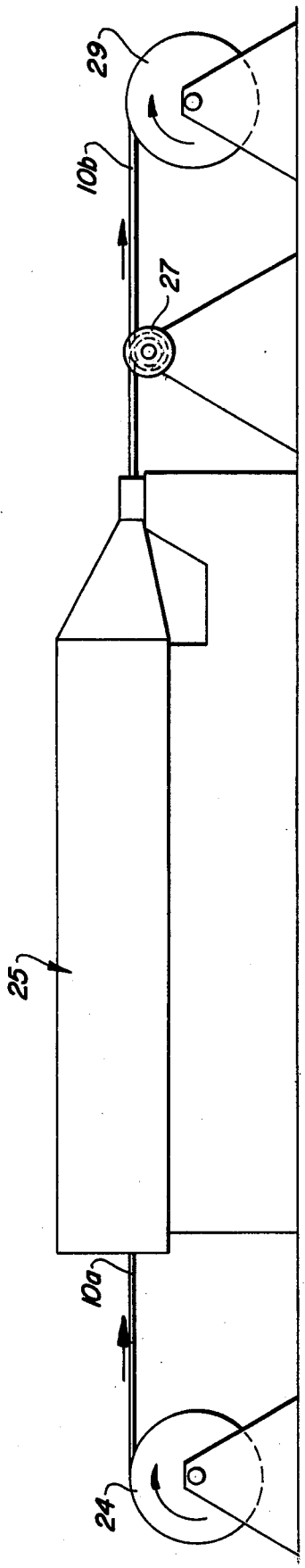
FIG. 2 is a schematic side elevation of the next succeeding part of said line of apparatus.
Figure 3:
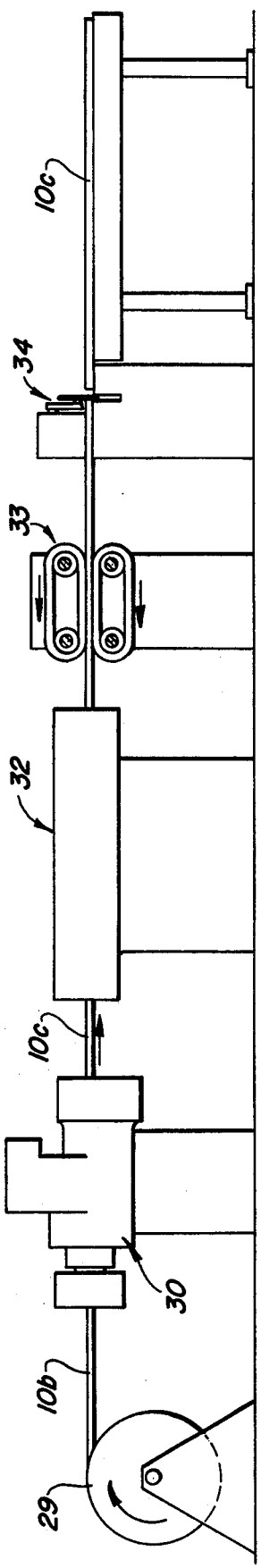
FIG. 3 is a schematic side elevation of the next succeeding part of said line of apparatus.

As indicated in FIG. 2, the storage reel 24 becomes a pay-off reel supplying the nylon-coated tape-covered mandrel 10a to a wire strander 25 of known construction which wraps a number of contiguous wires 26 (FIG. 6) helically around the outer nylon layer, preferably on a long pitch, and the wire-wrapped tube 10b is pulled from the strander by a capstan 27. Preferably, the wires 26 are helically wrapped in reverse direction with a retaining cord or tape 28 with spaced-apart turns to hold the wires 26 in place. From the capstan the wire-wrapped tube 10b can be coiled on a storage reel 29 or it can go directly to another crosshead extrusion die 30 shown in FIG. 3.

As the wire-wrapped tube 10b passes through crosshead die 30 an outer layer 31 (FIG. 6) is extruded over the tape-wound wires 26,28 to a controlled thickness. This layer 31 is a relatively soft layer of rubber or thermoplastic synthetic resin material which is the outer jacket of the finished conduit 10c. The conduit 10c passes through a coiling trough 32 and a puller 33, and then under a shear 34 which cuts it to desired lengths.

Figure 4:
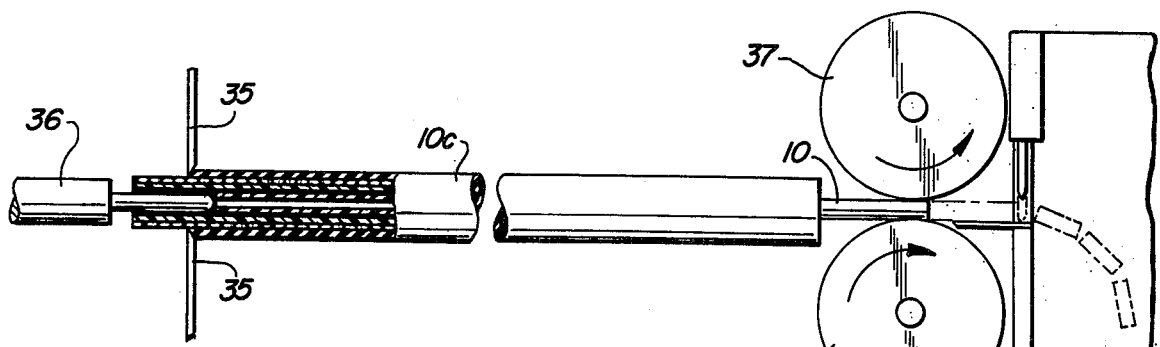
FIG. 4 is a schematic side elevation of the next succeeding and last part of said line of apparatus.

As shown in FIG. 4, the cut lengths of finished conduit 10c are successively positioned with one end between stripping blades 35 for removing a portion of the jacket layer 31 for the purpose of attaching a conventional fitting used for mounting the conduit in a desired operating installation. During the stripping action a heated mandrel 36 is inserted in the end of the conduit for pushing against the end of the inner nylon tubular mandrel 10. The heated mandrel additionally bonds the end edge of the tape 14 to the surrounding layer 20 and starts the longitudinal removal of mandrel 10 from the conduit. As the mandrel 10 emerges from the other end of the conduit it may be gripped by means such as pinch rolls 37 which completely extract it from the conduit, after which the mandrel may be cut by a shear 38 into short pieces for recycling.

After the mandrel 10 has been removed from the finished conduit, lubricant may be applied to the inner surface of the tape 14, and the pores therein serve as a lubricant reservoir which, when the cable core is inserted and moved through the conduit, greatly minimizes friction and sound transmission.

It will be apparent that an improved push-pull cable conduit has been provided together with an improved method of making the conduit.

I claim:

1. The method of making a push-pull cable conduit comprising continuously moving a tubular mandrel core of flexible material through a cross head extruding die, forming a thin tape of micro-porous fluorocarbonated resin continuously into a cylindrical covering over the mandrel as it enters the extruding die, extruding an outer layer of polymeric material over the cylindrical covering in the presence of heat to bond said material to said covering by penetration of said material into the pores of the covering, and subsequently removing the mandrel core.

2. The method as defined in claim 1, wherein a layer of contiguous helically arranged wires is continuously wrapped around said polymeric layer and an outer layer of polymeric material is extruded over said wire layer, before removal of the mandrel core.

3. The method as defined in claim 1, wherein said fluorocarbonated resin tape is an expanded micro-porous polytetrafluoroethylene resin.

4. The method as defined in claim 1, wherein said polymeric material is a thermoplastic material.

5. The method as defined in claim 1, wherein the tape of micro-porous fluorocarbonated resin is approximately 0.0035 inches in thickness.

6. The method as defined in claim 3, wherein the tape of micro-porous polytetrafluoroethylene resin is approximately 0.0035 inches in thickness.

7. The method as defined in claim 1, wherein the tape of micro-porous fluorocarbonated resin has approximately 65% open pores.

8. The method as defined in claim 3, wherein the tape of micro-porous polytetrafluoroethylene resin has approximately 65% open pores.

9. The method as defined in claim 2, wherein said outer layer of polymeric material is a thermoplastic material.

10. A push-pull cable conduit having an inner layer of micro-porous fluorocarbonated resin and an outer layer of polymeric material bonded thereto by penetration into the pores at the outer surface of the inner layer, said pores providing a lubricant reservoir at the inner surface of the inner layer.

11. A push-pull cable conduit as defined in claim 10, wherein said inner layer is a micro-porous expanded polytetrafluoroethylene resin.

12. A push-pull cable conduit as defined in claim 10, wherein said polymeric material is a thermoplastic material.

13. A push-pull cable conduit as defined in claim 10, wherein said inner layer is approximately 0.0035 inches thick.

14. A push-pull cable conduit as defined in claim 11, wherein said inner layer is approximately 0.0035 inches thick.

15. A push-pull cable conduit as defined in claim 10, wherein said inner layer has approximately 65% open pores.

16. A push-pull cable conduit as defined in claim 11, wherein said inner layer has approximately 65% open pores.

17. A push-pull cable conduit as defined in claim 10, wherein said inner layer contains a lubricant.

18. A push-pull cable conduit as defined in claim 11, wherein said inner layer contains a lubricant.

19. A push-pull cable conduit as defined in claim 10, wherein a layer of contiguous helically wrapped wires engirdles said layer of polymeric material, and a layer of polymeric material engirdles the wire layer.

20. A push-pull cable conduit as defined in claim 19, wherein said polymeric material engirdling said wire layer is a thermoplastic material.

* * * * *